US012804065B2

(12) United States Patent
Liu

(10) Patent No.: US 12,804,065 B2
(45) Date of Patent: Nov. 17, 2026

(54) HINGE AND FOLDABLE ELECTRONIC DEVICE

(71) Applicant: Beijing Xiaomi Mobile Software Co., Ltd., Beijing (CN)

(72) Inventor: Jianwei Liu, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 267 days.

(21) Appl. No.: 18/434,359

(22) Filed: Feb. 6, 2024

(65) Prior Publication Data

US 2024/0414253 A1 Dec. 12, 2024

(30) Foreign Application Priority Data

Jun. 12, 2023 (CN) ......................... 202310694037.8

(51) Int. Cl.
*H04M 1/02* (2006.01)

(52) U.S. Cl.
CPC ....... *H04M 1/0268* (2013.01); *H04M 1/0214* (2013.01)

(58) Field of Classification Search
CPC .... H04M 1/02; H04M 1/0206; H04M 1/0208; H04M 1/0214; H04M 1/0225; H04M 1/0249; H04M 1/026; H04M 1/0266; H04M 1/0268; G06F 1/16; G06F 1/1601; G06F 1/1652; G06F 1/1681; H05K 5/022; F16C 11/04
See application file for complete search history.

(56) References Cited

U.S. PATENT DOCUMENTS 11,726,530 B2 * 8/2023 Kang .................... G06F 1/1681 361/679.27
2018/0067519 A1 3/2018 Tazbaz et al.
2022/0316247 A1 10/2022 Kim et al.
2022/0317730 A1 * 10/2022 Cho ........................ H04M 1/02
2023/0053373 A1 * 2/2023 Kim .................... H04M 1/0268
2024/0035324 A1 2/2024 Kim et al.

FOREIGN PATENT DOCUMENTS

CN 115263909 A 11/2022
EP 4 072 110 A1 10/2022
EP 4 155 562 A1 3/2023

OTHER PUBLICATIONS

Extended European Search Report issued Jul. 12, 2024 in European Patent Application No. 24167478.7, 24 pages.

* cited by examiner

*Primary Examiner* — Quochien B Vuong
(74) *Attorney, Agent, or Firm* — Oblon, McClelland, Maier & Neustadt, L.L.P.

(57) ABSTRACT

A hinge includes a support structure, at least two rotating mechanisms and at least one elastic structure. Two of the at least two rotating mechanisms are rotatably connected to two opposite sides of the support structure. The at least one elastic structure is configured to reduce a fitting gap at a connection between the support structure and the rotating mechanism and/or a fitting gap at a connection between adjacent rotating members within the rotating mechanism.

19 Claims, 10 Drawing Sheets

HINGE AND FOLDABLE ELECTRONIC DEVICE

CROSS REFERENCE TO RELATED APPLICATION

This application is based upon and claims priority to Chinese Patent Application No. 2023106940378, filed on Jun. 12, 2023 the entire contents thereof are incorporated herein by reference.

BACKGROUND

Technical Field

With the development of flexible display technology, foldable electronic devices have gradually become an important trend in the development of mobile terminals because they have the portability of ordinary electronic devices and the good experience of large-screen display after being unfolded. Foldable electronic devices mainly rely on hinges when switching between unfolded and folded positions. The folding and unfolding of the hinges drive the flexible display to fold and unfold.

SUMMARY

This application relates to the technical field of terminal, and in particular to a hinge and a foldable electronic device. This application provides a hinge and a foldable electronic device, which are configured to reduce the fitting gap between the rotatably connected components in the hinge and improve the smoothness during usage of the hinge.

According to some embodiments, an aspect of this application provides a hinge, including a support structure, at least two rotating mechanisms and at least one elastic structure, two of the at least two rotating mechanisms are rotatably connected to two opposite sides of the support structure, and the at least one elastic structure is configured to reduce a fitting gap at a connection between the support structure and the rotating mechanism and/or a fitting gap at a connection between adjacent rotating members within the rotating mechanism.

According to some embodiments, another aspect of this application provides a foldable electronic device, including the hinge described in the above embodiments.

BRIEF DESCRIPTION OF THE DRAWINGS

The accompanying drawings, which are incorporated in and constitute a part of this specification, illustrate embodiments consistent with the application and together with the description, serve to explain the principles of the application.

DETAILED DESCRIPTION OF THE PREFERRED EMBODIMENTS

In the related art, a hinge includes a plurality of rotating members that are rotatably connected through a rotating shaft, with the fitting gap(s) at the connection(s) between adjacent rotating members being relatively large, thereby affecting the smoothness and stability of the hinge. In view of this, embodiments of this application provide a hinge in which an elastic structure(s) is provided at the connection(s) between two components that are rotatably connected to each other. The elasticity of the elastic structure(s) is used to reduce the fitting gap(s) between the components that are rotatably connected to each other, thereby improving the smoothness and stability during usage of the hinge.

The technical solutions of this application and how the technical solutions of this application solve the above technical problems will be described in detail below with some embodiments. These embodiments can be combined with each other, and the same or similar concepts or processes may not be repeated in some embodiments. The embodiments of this application will be described below with reference to the accompanying drawings.

Figure 1:
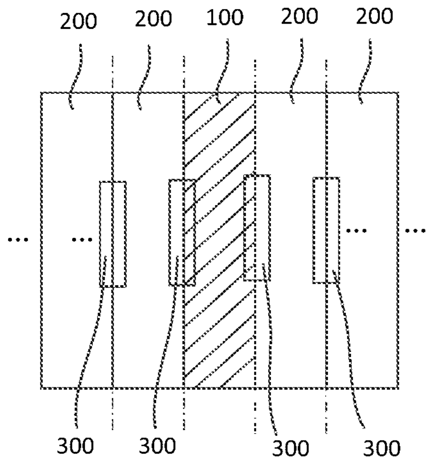
FIG. 1 is a schematic structural diagram of a hinge according to some embodiments of this application.
Figure 2:
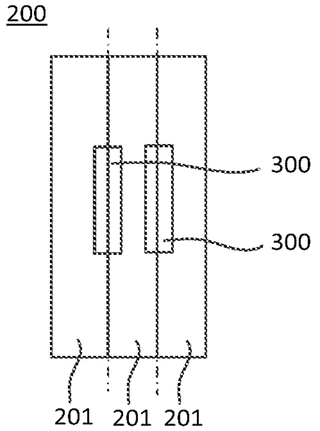
FIG. 2 is a schematic structural diagram of the rotating mechanism in FIG. 1.
Figure 3:
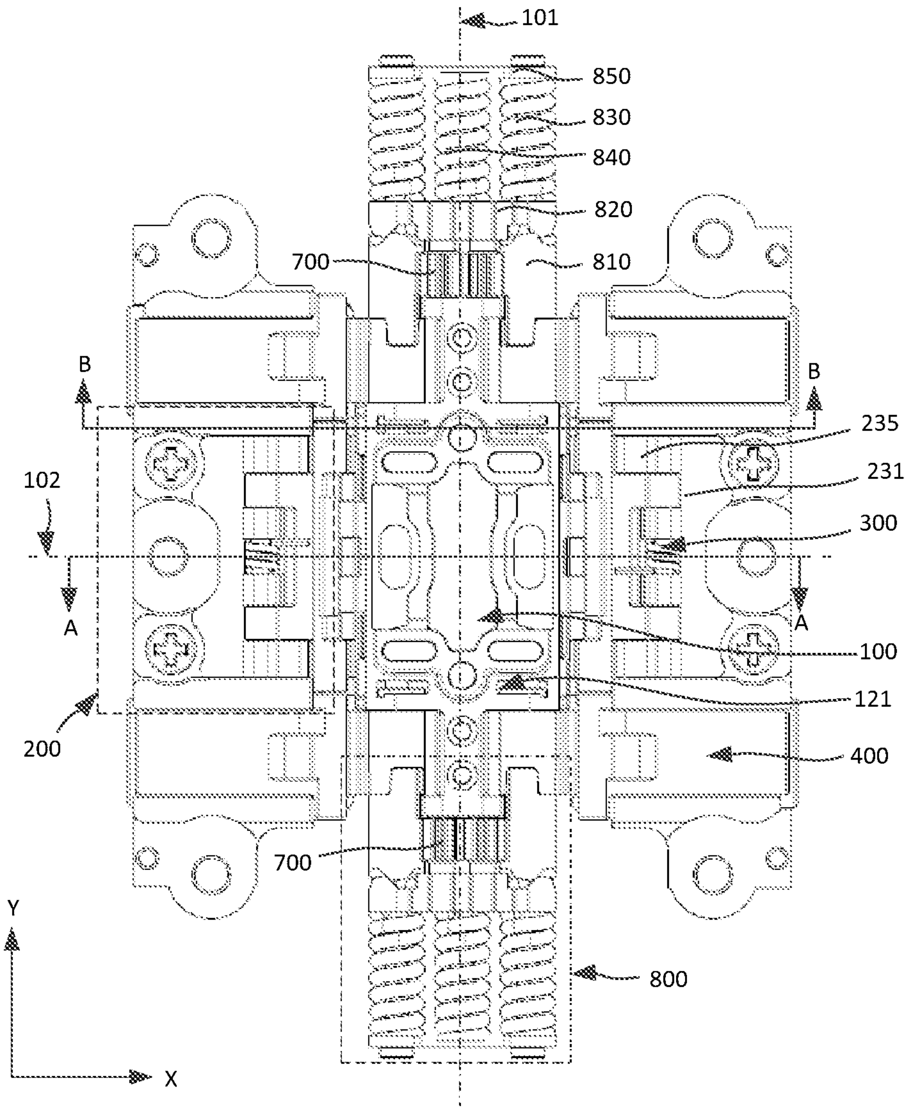
FIG. 3 is an assembly structural diagram of the hinge according to some embodiments of this application.
Figure 4:
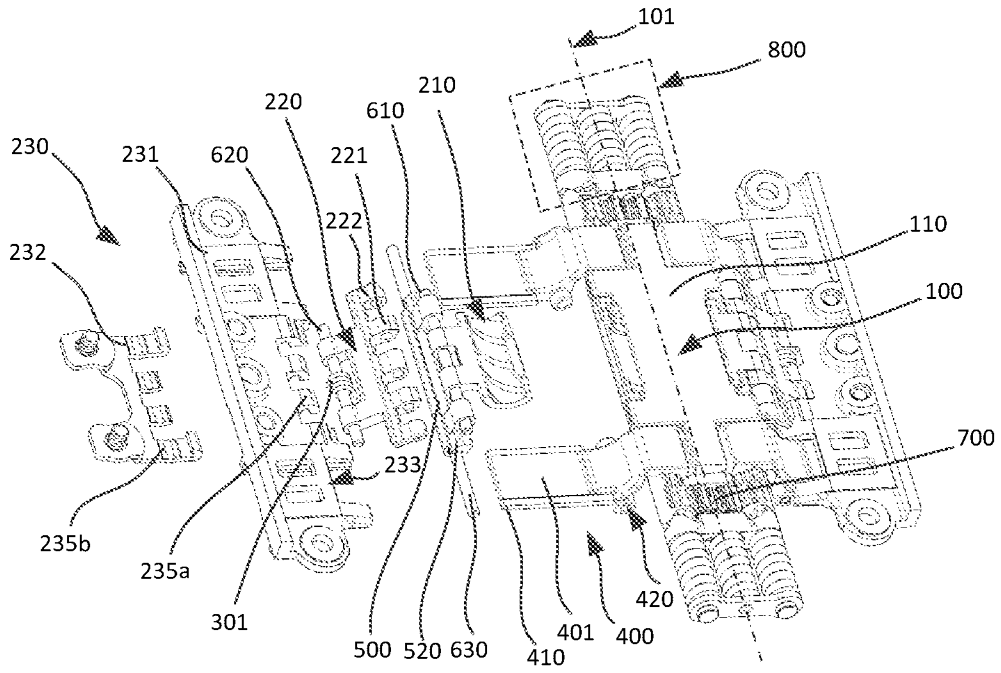
FIG. 4 is an exploded schematic view of the hinge in FIG. 3.
Figure 5:
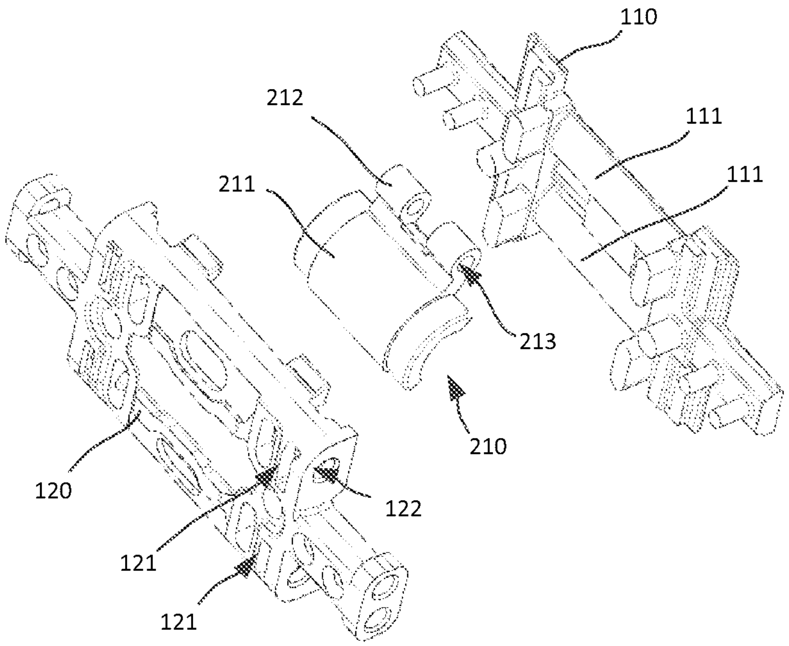
FIG. 5 is an exploded view of the support structure in FIG. 3 from a first perspective.
Figure 6:
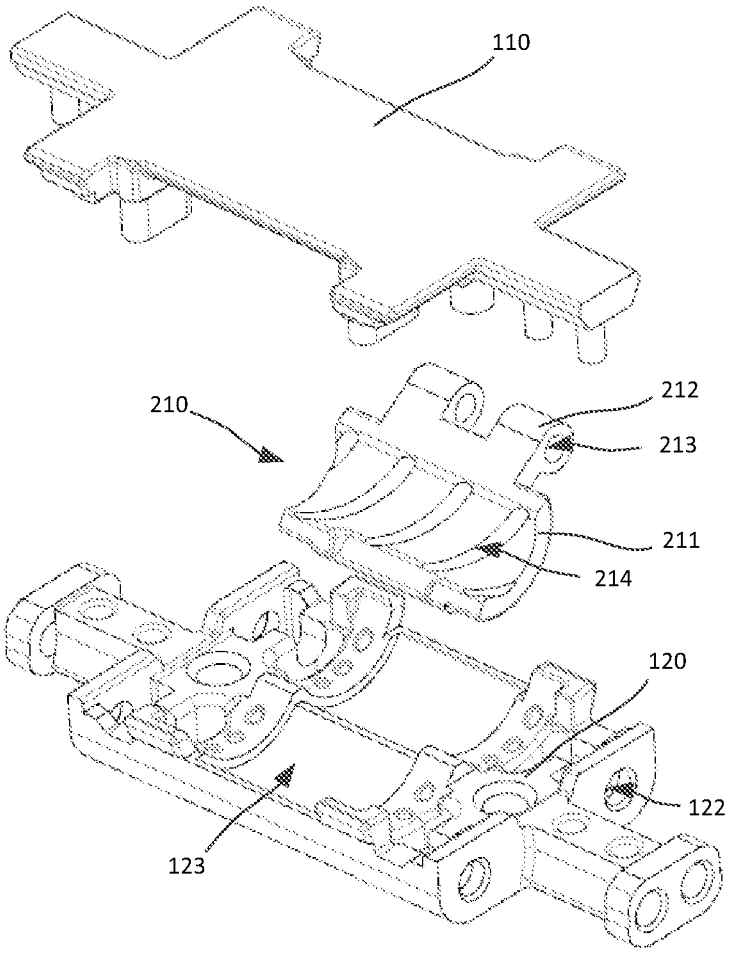
FIG. 6 is an exploded view of the support structure in FIG. 3 from a second perspective.
Figure 7:
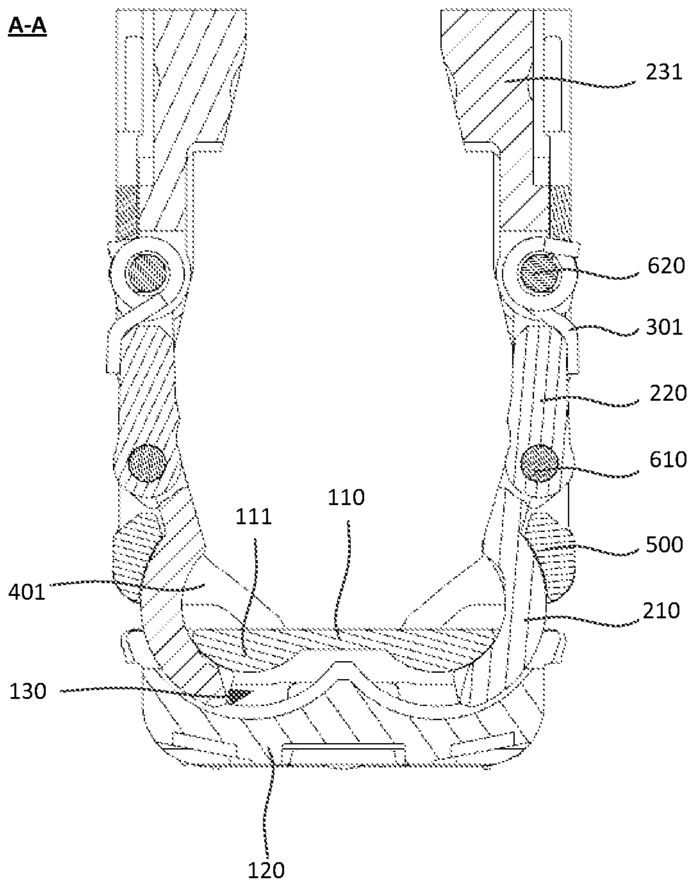
FIG. 7 is a cross-sectional view along the A-A direction in FIG. 3.
Figure 8:
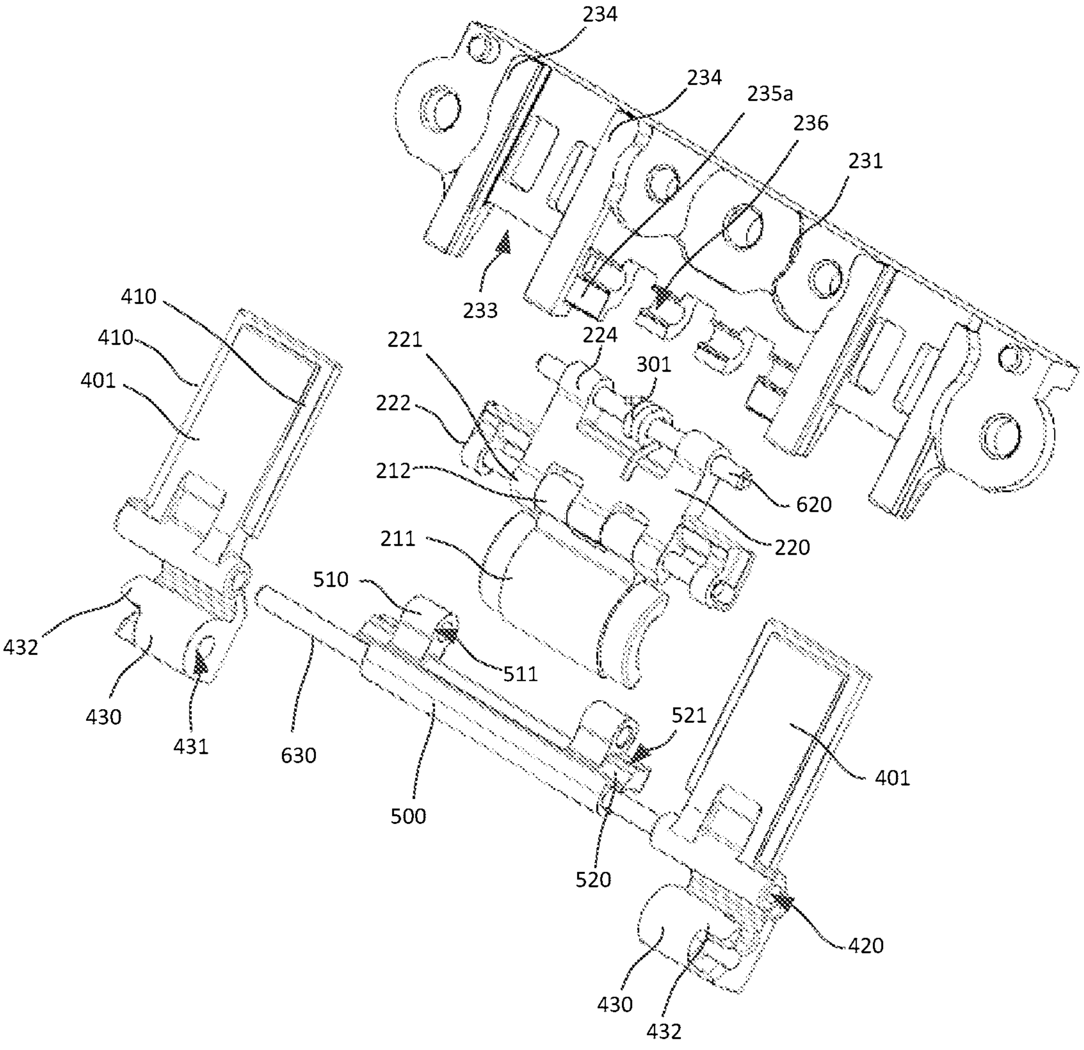
FIG. 8 is an exploded view of the rotating mechanism in FIG. 3.
Figure 9:
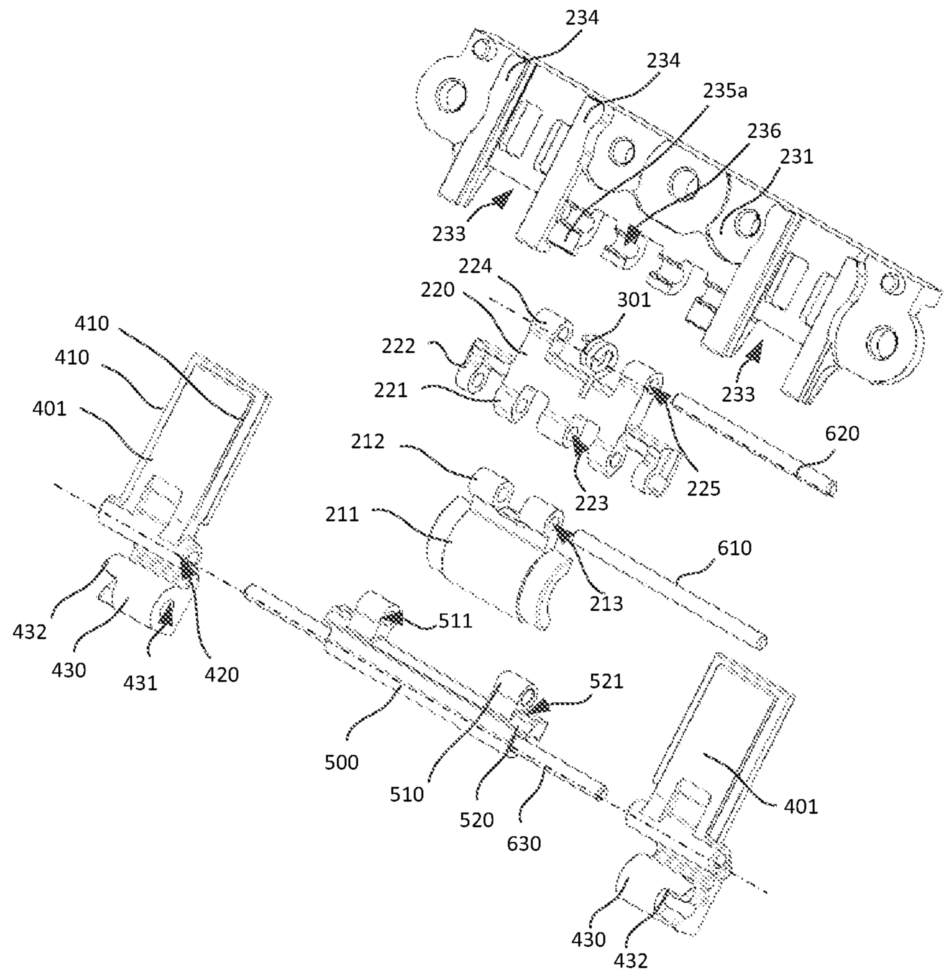
FIG. 9 is a further exploded view of the rotating mechanism in FIG. 8.
Figure 10:
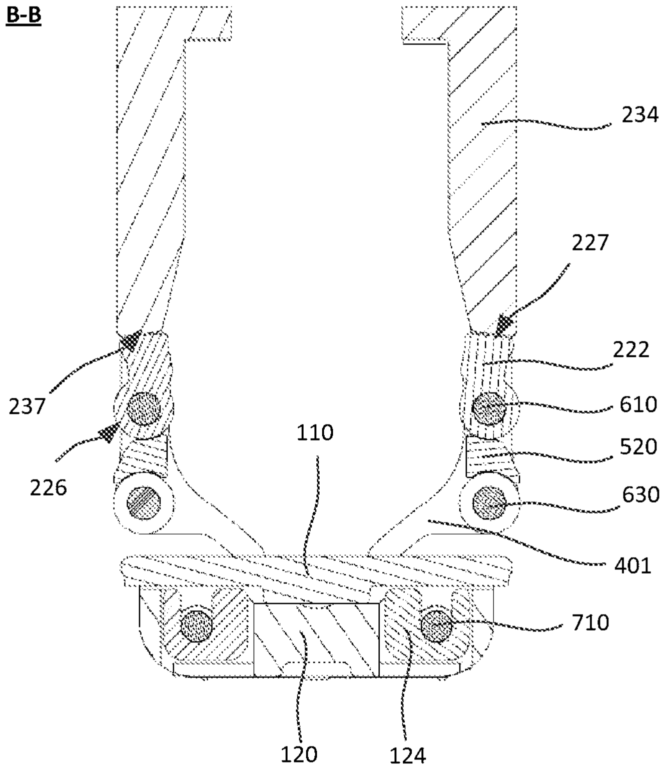
FIG. 10 is a cross-sectional view along the B-B direction in FIG. 3.
Figure 11:
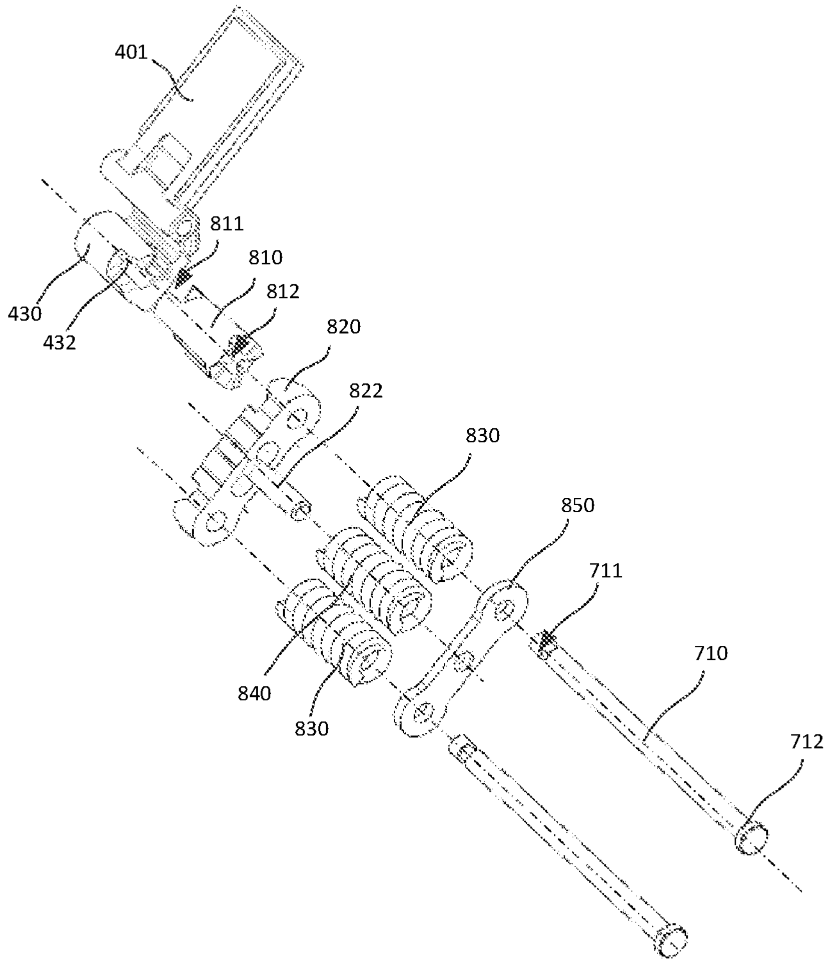
FIG. 11 is an exploded front view of the damping adjustment mechanism in FIG. 3.
Figure 12:
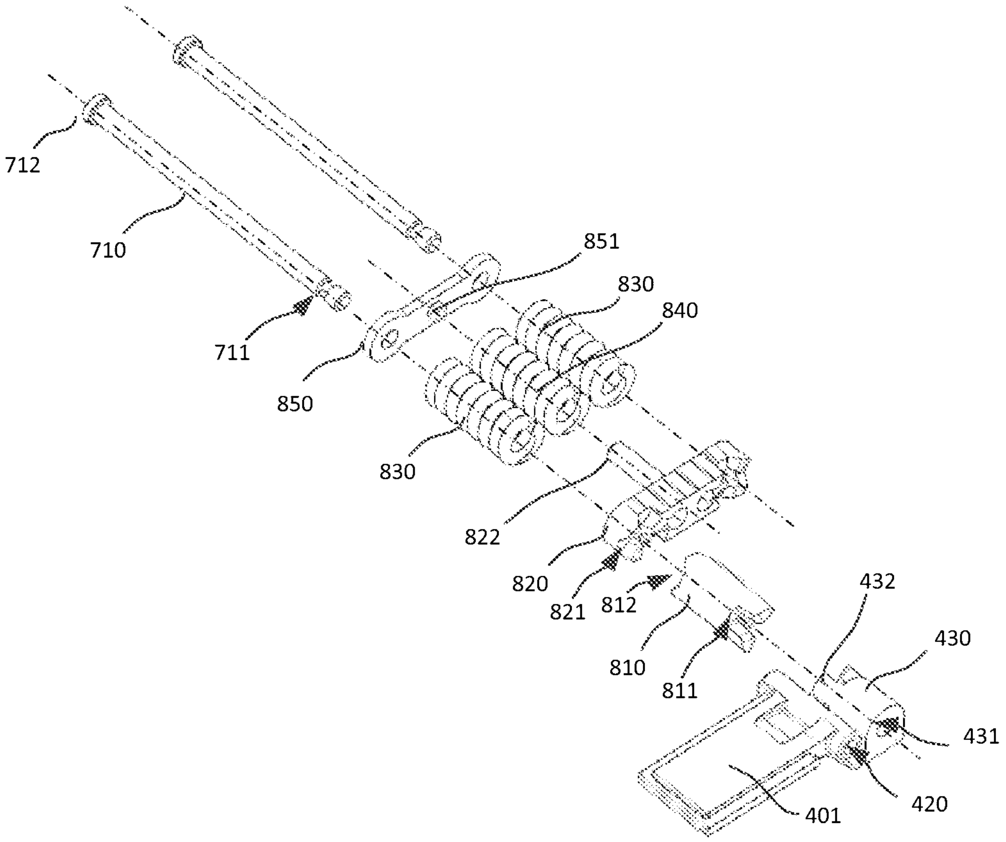
FIG. 12 is an exploded rear view of the damping adjustment mechanism in FIG. 3.

Referring to FIG. 1 to FIG. 12, FIG. 1 is a schematic structural diagram of the hinge according to some embodiments of this application, FIG. 2 is a schematic structural diagram of the rotating mechanism in FIG. 1, FIG. 3 is an assembly structural diagram of the hinge according to some embodiments of this application, FIG. 4 is an exploded view of the hinge in FIG. 3, FIG. 5 is an exploded view of the support structure in FIG. 3 from a first perspective, FIG. 6 is an exploded view of the support structure in FIG. 3 from a second perspective, FIG. 7 is a cross-sectional view along the A-A direction in FIG. 3, FIG. 8 is an exploded view of the rotating mechanism in FIG. 3, FIG. 9 is a further exploded view of the rotating mechanism in FIG. 8, FIG. 10 is a cross-sectional view along the direction B-B in FIG. 3, FIG. 11 is an exploded front view of the damping adjustment mechanism in FIG. 3, and FIG. 12 is an exploded rear view of the damping adjustment mechanism in FIG. 3.

Some embodiments of this application provide a hinge that can be applied in a foldable electronic device, and the hinge can be used to enable the foldable electronic device to be folded and unfolded. As shown in FIG. 1 and FIG. 2, the hinge according to some embodiments of this application includes a support structure 100, at least two rotating mechanisms 200 and at least one elastic structure 300, where the opposite sides of the support structure 100 are each rotatably connected to at least one rotating mechanism 200. For example, one rotating mechanism 200 is rotatably connected to each of opposite sides of the support structure 100. For another example, two rotating mechanisms 200 are rotatably connected to each of opposite sides of the support structure 100. The number of rotating mechanisms 200 rotatably connected on opposite sides of the support structure 100 can be the same or different, and can be set as needed.

The elastic structure 300 is provided at the connection between the support structure 100 and the rotating mechanism 200, and/or at the connection between adjacent rotating members 201 in the same rotating mechanism 200. The elastic structure 300 is configured to at least reduce a fitting gap at the connection between the support structure 100 and the rotating mechanism 200, and/or a fitting gap at the connection between adjacent rotating members 201 in the rotating mechanism 200.

In some embodiments, the elastic structure 300 can also be provided at the connection between adjacent rotating mechanisms 200 located on the same side of the support structure 100. Accordingly, the elastic structure 300 is also configured to reduce a fitting gap at the connection between two rotating mechanisms 200 that are rotatably connected.

In the hinge according to some embodiments, the elastic structure 300 is provided at the connection between the support structure 100 and the rotating mechanism 200, and/or at the connection between the adjacent rotating members 201 in the rotating mechanism 200, so the elastic force provided by the elastic structure is used to reduce the fitting gap(s) between rotatably connected parts within the hinge, thereby improving the smoothness and stability during usage of the hinge. In addition, the elastic force provided by the elastic structure 300 can also be used to reduce the abnormal rotation noise of the hinge when switching between a folded position and an unfolded position.

It can be understood that in the forgoing embodiments and the following embodiments, the "connection" refers to a position or area/region where two or more components are rotatably connected. When referring to that the elastic structure 300 is provided at the connection, it can, but not limited to, be provided inside the connection, or be partially provided inside the connection and partially provided outside the connection. In other words, the elastic structure 300 may be located between two components that are rotatably connected; or a part of the elastic structure 300 may be provided between two components that are rotatably connected, and the other part may be provided outside the two components that are rotatably connected.

The support structure 100 is at least used to support a flexible display screen of the foldable electronic device and to connect other structures in the hinge, such as to rotatably connect the rotating mechanism 200. The support structure 100 may be a columnar, plate-shaped or other shaped structure, which is not limited in the embodiments. In addition, the support structure 100 may be a symmetrical structure or an asymmetrical structure. For example, as shown in FIG. 3, the support structure 100 has a first centerline 101 and a second centerline 102, and the first centerline 101 is perpendicular to the second centerline 102. The left and right sides of the support structure 100 are symmetrical relative to the first centerline 101, and the upper and lower ends of the support structure 100 are symmetrical relative to the second centerline 102.

The rotating mechanism 200 is rotatably connected to the support structure 100. The rotating mechanism 200 is also connected to the flexible display screen in the foldable electronic device, and is used to support the flexible display screen and realize the folding and unfolding of the flexible display screen. There are many ways of rotatable connection between the rotating mechanism 200 and the support structure 100. For example, the rotating mechanism 200 and the support structure 100 are rotatably connected through a rotating shaft; for another example, the rotating mechanism 200 and the support structure 100 are rotatably connected through an arc-shaped mounting groove and an arc-shaped mounting portion; for another example, the rotating mechanism 200 and the support structure 100 are rotatably connected through hinges.

As an example, the rotating mechanism 200 and the support structure 100 are rotatably connected through a rotating shaft, where the rotating shaft extends along a first direction, and at least one of the rotating mechanism 200 and the support structure 100 can rotate relative to the rotating shaft. At least one rotating mechanism 200 can be rotatably connected to each of the opposite sides of the support structure 100. When two or more rotating mechanisms 200 are rotatably connected to the opposite sides of the support structure 100, the rotating mechanisms 200 located on the same side of the support structure 100 can also be rotatably connected through rotating shafts. When the hinge is in the unfolded position, these rotating mechanisms 200 are located on opposite sides of the support structure 100 and arranged along a second direction, where the second direction is perpendicular to the first direction.

It can be understood that the "unfolded position" means that the hinge can be unfolded to an open state and, at this time, the rotating mechanism 200 and the support structure 100 can be on the same plane. The "folded position" means that the hinge can be folded to a closed state, and the hinge may have a teardrop-shaped cross-section when closed.

The rotating mechanism 200 may include one rotating member 201, two rotating members 201, or multiple rotating members 201. In other words, the rotating mechanism 200 includes at least one rotating member 201. When the rotating mechanism 200 includes at least two rotating members 201, respective rotating members 201 in the rotating mechanism 200 may be arranged sequentially along the second direction in FIG. 3, and two adjacent rotating members 201 may be rotatably connected through a rotating shaft, where the rotating shaft extends along the first direction.

It can be understood that the first direction may be the Y direction in FIG. 3, the first direction is the same as the extending direction of the first centerline 101; the second direction may be the X direction in FIG. 3, and the second direction is the same as the extending direction of the second centerline 102. The two (opposite) sides of the support structure 100 refer to the left and right sides of the support structure 100 when the hinge is in the unfolded position as shown in FIG. 3, and the two ends of the support structure 100 refer to the upper and lower ends of the support structure as shown in FIG. 3.

As shown in FIG. 1 and FIG. 2, the elastic structure 300 is provided at at least one of the following connections: the connection between the support structure 100 and the rotating mechanism 200, the connection between the adjacent rotating mechanisms 200 on the same side of the support structure 100, the connection between two adjacent rotating members 201 in the rotating mechanism 200.

For example, as shown in FIG. 3 and FIG. 4, the rotating mechanism 200 includes a first rotating member 210, a second rotating member 220 and a third rotating member 230 that are rotatably connected in sequence. The first rotating member 210 is rotatably connected to the support structure 100. The elastic structure 300 is provided at at least one of the following connections: the connection between the first rotating member 210 and the support structure 100, the connection between the first rotating member 210 and the second rotating member 220, the connection between the second rotating member 220 and the third rotating member 230. In other words, the elastic structure(s) 300 is provided at the connections between any two components that are rotatably connected in the hinge, and is used to reduce the fitting gaps at the connection between the any two components that are rotatably connected.

The elastic structure 300 may be a torsion spring, an arc-shaped elastic piece, an arc-shaped elastic arm, a rubber strip, or other elastic means. The following is an example of how the clastic structure 300 is arranged and its exemplary structure.

In some embodiments, the rotating mechanism 200 includes one rotating member 201, that is, the rotating mechanism 200 includes the first rotating member 210, and the first rotating member 210 is rotatably connected to the support structure 100. For example, the rotatable connection can be achieved through a rotating shaft, the rotatable connection can also be achieved through an arc-shaped mounting groove and an arc-shaped mounting portion that are matched, or the rotating connection can be achieved through hinges. For example, the first rotating member 210 and the support structure 100 are rotatably connected through the arc-shaped mounting groove and an arc-shaped mounting portion that are matched. In this case, the clastic structure 300 is provided at the connection between the support structure 100 and the first rotating member 210.

In some other embodiments, the rotating mechanism 200 includes two rotating members 201, that is, the rotating mechanism 200 includes a first rotating member 210 and a second rotating member 220, where one side of the first rotating member 210 is rotatably connected to the support structure 100, and the other side of the first rotating member 210 is rotatably connected to the second rotating member 220. In some embodiments, the rotatable connections between the support structure 100 and the first rotating member 210, and between the first rotating member 210 and the second rotating member 220 can be achieved through a rotating shaft, or can also be achieved through an arc-shaped mounting groove and an arc-shaped mounting portion that are matched, or can be achieved through hinges. For example, both the rotatable connection between the support structure 100 and the first rotating member 210, and the rotatable connection between the first rotating member 210 and the second rotating member 220 are achieved through rotating shafts.

When the rotating mechanism 200 includes two rotating members 201, the number of clastic structure 300 may be one. In this case, the clastic structure 300 is provided at the connection between the support structure 100 and the first rotating member 210, or the clastic structure 300 is provided at the connection between the first rotating member 210 and the second rotating member 220. The number of clastic structures 300 can also be two. In this case, one of the two clastic structures 300 is provided at the connection between the support structure 100 and the first rotating member 210, and the other is provided at the connection between the first rotating member 210 and the second rotating member 220.

In other embodiments, the rotating mechanism 200 includes three or N rotating members 201, that is, the rotating mechanism 200 includes a first rotating member 210, a second rotating member 220, a third rotating member 230, . . . , and an N-th rotating member, where N is a positive integer greater than three. These rotating members 201 are sequentially rotatably connected along the second direction. For example, the rotatable connection can be achieved through a rotating shaft, or can be achieved through an arc-shaped mounting groove and an arc-shaped mounting portion that are matched, or can be achieved through hinges. For example, the rotating mechanism 200 includes three rotating members 201, which are the first rotating member 210, the second rotating member 220 and the third rotating member 230 respectively. In some embodiments, the rotatable connections between the support structure 100 and the first rotating member 210, between the first rotating member 210 and the second rotating member 220, and between the second rotating member 220 and the third rotating member 230 can be achieved through a rotating shaft, or can also be achieved through an arc-shaped mounting groove and an arc-shaped mounting portion that are matched, or can be achieved through hinges. For example, all of the rotatable connections between the support structure 100 and the first rotating member 210, between the first rotating member 210 and the second rotating member 220, and between the second rotating member 220 and the third rotating member 230 are achieved through rotating shafts.

The number of the clastic structure 300 may be one. Accordingly, the elastic structure 300 is provided at the connection between the support structure 100 and the first rotating member 210, or the clastic structure 300 is provided at the connection between the first rotating member 210 and the second rotating member 220, or the clastic structure 300 is provided at the connection between the second rotating member 220 and the third rotating member 230.

The number of the clastic structure 300 may be two. Accordingly, one of the two clastic structures 300 is provided at the connection between the support structure 100 and the first rotating member 210, and the other is provided at the connection between the first rotating member 210 and the second rotating member 220; or, one of the two clastic structures 300 is provided at the connection between the support structure 100 and the first rotating member 210, and the other is provided at the connection between the second rotating member 220 and the third rotating member 230; or, one of the two elastic structures 300 is provided at the connection between the first rotating member 210 and the second rotating member 220, and the other is provided at the connection between the second rotating member 220 and the third rotating member 230.

It should be noted that the greater the number of rotating members 201 included in the rotating mechanism 300, the greater the freedom degree of the hinge having such a rotating mechanism. For example, the rotating mechanism 200 includes three rotating members 201, so that each rotating mechanism 200 can provide three rotational degrees of freedom, two rotating mechanisms 200 can provide six rotational degrees of freedom, and so on. When the hinge includes greater number of rotating mechanisms 200 and greater number of rotating members 201 included in the rotating mechanism 200, the more degrees of freedom the hinge will have, thereby enabling the flexible display, when the foldable electronic device using the hinge is folded, to fit better with the hinge, and to be more smoothly unfolded when the foldable electronic device is unfolded.

The rotating mechanism 200 including three rotating members 201 will be further described below as an example. In other words, the rotating mechanism 200 includes a first rotating member 210, a second rotating member 220 and a third rotating member 230, where the first rotating member 210 and the second rotating member 220 are rotatably connected through the a rotating shaft 610, the second rotation member 220 and the third rotation member 230 are rotatably connected through a second rotating shaft 620, and the first rotation member 210 and the support structure 100 are rotatably connected through a third rotating shaft.

The elastic structure 300 is provided at at least one of the following connections: the connection between the first rotating member 210 and the support structure 100, the connection between the first rotating member 210 and the second rotating member 220, and the connection between the second rotating member 220 and the third rotating member 230. In other words, the elastic structure 300 can be provided at the connection between the first rotating member 210 and the second rotating member 220, or at the connection between the second rotating member 220 and the third rotating member 230, or at the connection between the support structure 100 and the first rotating member 210, or at all connections in the hinge. In this example, there is one elastic structure 300, which is provided at the connection between the second rotating member 220 and the third rotating member 230.

In some embodiments, as shown in FIG. 3 to FIG. 7, two third rotating shafts are provided on opposite sides of the support structure 100, and the two rotating mechanisms 200 are rotatably connected to the support structure 100 through the two third rotating shafts, respectively. In some embodiments, the third rotating shaft can be a separate structure with the support structure 100, or can be an integrated structure with the support structure 100. If the third rotating shaft and the support structure 100 are an integrated structure, then the third rotating shaft belongs to a part of the support structure 100.

As an example, the two third rotating shafts can be symmetrically arranged relative to the first centerline 101 of the support structure 100, and the rotating mechanisms 200 rotatably connected to the two third rotating shafts, respectively, can also be symmetrically arranged relative to the first centerline 101 of the support structure 100. The rotating mechanism 200 includes a first rotating member 210, and the first rotating member 210 is rotatably connected to the support structure 100 through the third rotating shaft.

In some embodiments, as shown in FIG. 3 to FIG. 7, the first rotating member 210 includes an arc-shaped mounting portion 211, and the arc-shaped mounting portion 211 is rotatably mounted on the outer peripheral surface of the third rotating shaft, where the shape of the arc-shaped mounting portion 211 may be arc-shaped or approximately arc-shaped. The elastic structure 300 is mounted between the arc-shaped mounting portion 211 and the third rotating shaft. One end of the elastic structure 300 is fixedly connected to the support structure 100, and the other end of the elastic structure 300 abuts with the outer peripheral surface of the arc-shaped mounting portion 211. The elastic structure 300 is configured to cause the arc-shaped mounting portion 211 to abut with the outer peripheral surface of the third rotating shaft.

As an example, as shown in FIG. 5, FIG. 6 and FIG. 7, the support structure 100 includes a support plate 110 and a cover plate 120. The front of the support plate 110 is used to support the flexible display screen, and the back of the support plate 110 is fixedly connected to the cover plate 120 through, for example, multiple screws and multiple connection pins. The surface of the support plate 110 facing the cover plate 120, that is, the back surface of the support plate 110, is provided with an arc-shaped protrusion 111 serving as the third rotating shaft. Taking a plane perpendicular to the first centerline 101 as a cross-section, the cross-sectional shape of the arc-shaped protrusion 111 may be arc-shaped or approximately arc-shaped.

In this example, each third rotating shaft corresponds to one arc-shaped protrusion 111, that is, two arc-shaped protrusions 111 are provided on the back of the support plate 110, and the two arc-shaped protrusions 111 are symmetrical relative to the first centerline 101. Correspondingly, two arc-shaped grooves 123 are provided on the surface of the cover plate 120 facing the support plate 120. The two arc-shaped grooves 123 correspond to the two arc-shaped protrusions 111 one by one. Each arc-shaped groove 123 and its corresponding one of the two arc-shaped protrusions 111 form an arc-shaped mounting groove 130. Taking a plane perpendicular to the first centerline 101 as a cross-section, the cross-sectional shape of the arc-shaped mounting groove 130 can be annular or approximately annular.

The arc-shaped mounting portion 211 of the first rotating member 210 is rotatably mounted in the arc-shaped mounting groove 130. By using the arc-shaped mounting groove 130, the arc-shaped mounting portion 211 of the first rotating member 210 can be rotatable relative to the arc-shape protrusion (third rotating shaft) 111 and, during rotation of the first rotating member 210 relative to the arc-shaped protrusion 111, the first rotating member 210 can be extended or retracted along the arc-shaped mounting groove 130. Accordingly, the hinge has the ability to adjust the length, so that the hinge can be applied to flexible displays of various lengths, thereby improving the applicability of the hinge.

When the elastic structure 300 is provided at the connection between the support structure 100 and the first rotating member 210, the clastic structure 300 can be provided in the arc-shaped mounting groove 130, with one end of the elastic structure 300 being fixedly connected to the support structure 100, for example, fixedly connected to the cover plate 120, and the other end of the elastic structure 300 abutting with the outer peripheral surface of the arc-shaped mounting portion 211. When the arc-shaped mounting portion 211 rotates relative to the arc-shaped protrusion 111, the clastic structure 300 presses the arc-shaped mounting portion 211 to abut with the outer peripheral surface of the arc-shaped protrusion 111 serving as the third rotation shaft. In other words, the clastic structure 300 will provide the clastic force for making the arc-shaped mounting portion 211 abut with the outer peripheral surface of the arc-shaped protrusion 111, so as to reduce the radial fitting gap between the arc-shaped mounting portion 211 of the first rotating member 210 and the arc-shaped protrusion 111 serving as the third rotating shaft, thereby improving the smoothness and stability of the hinge and, in addition, eliminating abnormal rotation noise between the first rotating member 210 and the support structure 100.

As an example, the elastic structure 300 may include an arc-shaped elastic arm. The arc-shaped clastic arm is mounted in the arc-shaped mounting groove 130, with one end of the arc-shaped elastic arm being located outside the arc-shaped mounting groove 130 and is fixedly connected to the support structure 100, and the other end abutting with the outer peripheral surface of the arc-shaped mounting portion 211.

It can be understood that the length of the arc-shaped mounting groove 130 can be selected according to needs. For example, the length of the arc-shaped mounting groove 130 is a quarter arc, so that the arc-shaped mounting portion 211 can rotate in a range of 0-90° relative to the arc-shaped mounting groove 130.

In some embodiments, as shown in FIG. 6, a plurality of spiral oil storage grooves 214 are provided on the inner side of the arc-shaped mounting portion 211. In other words, the spiral oil storage grooves 214 are provided on a mating surface of the arc-shaped mounting portion 211 and the arc-shaped protrusion 111, and the spiral oil storage grooves 214 are used to store lubricating oil or grease. As an example, the spiral oil storage grooves 214 extend along the circumferential direction of the arc-shaped mounting portion 211, and the respective spiral oil storage grooves 214 are arranged at equal intervals along the axial direction of the third rotating shaft.

By providing the spiral oil storage groove 214 on the inner side of the arc-shaped mounting portion 211, on the one hand, the spiral oil storage groove 214 can be used to disperse the stress nearby the spiral oil storage groove 214, so that the stress is not concentrated on a same circumference of the arc-shaped mounting portion 211, thereby improving the impact strength of the arc-shaped mounting portion 211; and on the other hand, the use of spiral oil storage groove 214 also facilitates the flow of lubricating oil, thereby making the lubrication be more adequate between the arc-shaped mounting portion 211 and the arc-shaped protrusion 111.

The side of the first rotating member 210 close to the support structure 100 is rotatably connected to the support structure 100 through the third rotating shaft. The side of the first rotating member 210 away from the support structure 100 is rotatably connected to the second rotating member 220 through the first rotating shaft 610. In some embodiments, the second rotating member 220 is provided with a third connecting part on a side close to the first rotating member 210, the first rotating member 210 is provided with a fourth connecting part on a side close to the second rotating member 220, and the second rotating member 220 is rotatably connected to the first rotating member 210 through the third connecting part, the first rotating shaft 610 and the fourth connecting part.

As an example, as shown in FIG. 4 to FIG. 9, the fourth connecting part includes at least two fourth lugs 212 provided on the side of the first rotating member 210 away from the support structure 100, and the respective fourth lugs 212 are arranged at intervals along the first direction. Each fourth lug 212 is provided with a fourth through hole 213, and the centerlines of the fourth through holes 213 in the respective fourth lugs 212 coincide. In other words, the fourth through holes 213 in the first rotating member 210 are arranged coaxially.

Correspondingly, the third connecting part includes at least two third lugs 221 provided on the side of the second rotating member 220 close to the first rotating member 210 and spaced apart along the first direction. Each third lugs 221 are all provided with a third through hole 223, and the respective third through hole 223 are arranged coaxially. The second rotating member 220 and the first rotating member 210 are rotatably connected through the first rotating shaft 610 that passes through the respective third through hole 223 and respective fourth through hole 213.

When the second rotating member 220 and the first rotating member 210 are rotatably connected through the first rotating shaft 610 that passes through the respective third through hole 223 and respective fourth through hole 213, each third lug 221 is located between two adjacent fourth lugs 212, and/or each fourth lug 212 is located between two adjacent third lugs 221; and along the first direction, the respective fourth lugs 212 and respective third lugs 221 are arranged in an alternate manner. In other words, the third lug 221 is located in the accommodation space formed by two adjacent fourth lugs 212, and the fourth lug 212 is located in the accommodation space formed by two adjacent third lugs 221. The third lugs 221 and the fourth lugs 212 are inserted into each other in the accommodation space formed by each other, and are alternately arranged along the first direction.

As an example, as shown in FIG. 4, FIG. 5, FIG. 6, FIG. 8 and FIG. 9, the second rotating member 220 includes three third lugs 221, and the first rotating member 210 includes two fourth lugs. The two fourth lugs 212 are respectively located between the three third lugs 221, and the fourth lugs 212 and the third lugs 221 are alternately arranged along the first direction. In other words, when the second rotating member 220 and the first rotating member 210 are rotatably connected through the first rotating shaft 610, the two fourth lugs 212 are respectively located between two adjacent third lugs 221, and the third lug 221, in the middle position, is located between the two fourth lugs 212.

One side of the second rotating member 220 is rotatably connected to the first rotating member 210 through the first rotating shaft 610, and the other side of the second rotating member 220 is rotatably connected to the third rotating member 230 through the second rotating shaft 620. The elastic structure 300 is sleeved on the first rotating shaft 610 and/or the second rotating shaft 620. The clastic structure 300 is used to reduce, when the hinge is in the folded position, the radial fitting gap between the second rotating shaft 620 and respective one of the second rotating member 220 and the third rotating member 230, and/or the radial fitting gap between the first rotating shaft 610 and respective one of the first rotating member 210 and the second rotating member 220.

In some embodiments, as shown in FIG. 4, FIG. 8 and FIG. 9, the elastic structure 300 provided at the connection between the second rotating member 220 and the third rotating member 230 includes a torsion spring 301, and the torsion spring 301 is sleeved on the second rotating shaft 620, with two ends of the torsion spring 301 being fixedly connected to the second rotating member 220 and the third rotating member 230, respectively. The two ends of the torsion spring 301 can provide reverse torsion, so that when the hinge is in the folded position, the torsion spring 301 can reduce the radial fitting gap between the second rotating shaft 620 and respective one of the second rotating member 220 and the third rotating member 230.

The rotatable connection between the second rotating member 220 and the third rotating member 230 can be achieved in many ways. In some embodiments, the third rotating member 230 is provided with a first connecting part on a side close to the second rotating member 220, the second rotating member 220 is provided with a second connecting part on a side close to the third rotating member 230, and the third rotating member 230 is rotatably connected to the second rotating member 220 through the first connecting part, the second rotating shaft 620 and the second connecting part.

As an example, as shown in FIG. 4, FIG. 8 and FIG. 9, the first connecting part includes at least two first lugs 235 provided on a side of the third rotating member 230 close to the second rotating member 220 and spaced apart along the first direction. The first lug 235 is provided with a first through hole 236, and the respective first through holes 236 are arranged coaxially. Correspondingly, the second connecting part includes at least two second lugs 224 provided on a side of the second rotating member 220 close to the third rotating member 230 and spaced apart along the first direction. The second lugs 224 is provided with a second through hole 225, and the respective second through holes 225 are arranged coaxially. The second rotating shaft 620 is inserted into the respective first through holes 236 and respective second through holes 225, so that the second rotating member 220 and the third rotating member 230 are rotatably connected through the second rotating shaft 620.

Each first lug 235 is located between two adjacent second lugs 224, and/or, each second lug 224 is located between two adjacent first lugs 235. One end of the torsion spring 301 is located between the two first lugs in the middle position among the at least two first lugs 235, and the other end of the torsion spring 301 is located between the two second lugs in the middle position among the at least two second lugs 224. In this example, the third rotating member 230 includes four first lugs 235, and the second rotating member 220 includes two second lugs 224. Accordingly, one end of the torsion spring 301 is fixedly connected to the third rotating member 230 located between the two first lugs 235 in the middle position among the four first lugs 235, and the other end of the torsion spring 301 is fixedly connected to the second rotating member 220 located between the two second lugs 224. When the second rotating member 220 and the third rotating member 230 are rotatably connected through the second rotating shaft 620, the two second lugs 224 are respectively located between the four first lugs 235.

In some embodiments, as shown in FIG. 4, FIG. 8 and FIG. 9, the third rotating member 230 includes a body 231 and a pressure plate 232 that are fixedly connected. The body 231 is provided with at least two first docking parts 235*a*. The pressure plate 232 is provided with at least two second docking parts 235*b* corresponding to the at least two first docking parts 235*a* one by one. The first docking part 235*a* and the second docking part 235*b* are both provided with a semicircular hole, and one first docking part 235*a* and one corresponding second docking part 235*b* butt to form one first lug 235.

Exemplarily, the first docking part 235*a* and the second docking part 235*b* may be formed in a half-lug structure, and a semicircular hole is provided in each half-lug structure. The first docking part 235*a* and the second docking part 235*b* can butt together to form the first lug 235, and the semicircular holes in the two half-lug structures can form the first through hole 236.

By configuring the first lug 235 to be formed by one first docking part 235*a* and one second docking part 235*b*, the second rotating shaft 620 and the torsion spring 301 can be easily mounted on the third rotating member 230 or removed from the third rotating member 230, thereby facilitating maintenance of the hinge.

In the forgoing hinge, the torsion spring 301 is provided at the connection between the second rotating member 220 and the third rotating member 230. When the hinge stays at the unfolded position, the folded position or switches therebetween, the torsion force provided by the torsion spring 301 can be used to make both the second rotating member 220 and the third rotating member 230 abut with the outer peripheral surface of the second rotating shaft 620, so as to reduce the radial fitting gap between the second rotating shaft 620 and respective one of the second rotating member 220 and the third rotating member 230, thereby improving the smoothness and stability during usage of the hinge, and further reducing the abnormal rotational noise between the second rotating member 220 and the third rotating member 230 when the hinge is switched between the unfolded position and the folded position.

Based on the forgoing embodiments, the hinge may further include at least two synchronization structures 400 corresponding to the at least two rotating mechanisms 200 one by one. The synchronization structure 400 rotates synchronously with a corresponding rotating mechanism 200. As an example, as shown in FIG. 3, FIG. 4, FIG. 8 and FIG. 9, the hinge includes two synchronization structures 400, which are rotatably connected to the two rotating mechanisms 200, respectively. In other words, each synchronization structure 400 is rotatably connected to a corresponding rotating mechanism 200. With this design, the two synchronous structures 400 can be used to keep the two rotating mechanisms 200 rotating synchronously, thereby improving the rotational stability of the hinge.

In some embodiments, the rotating mechanism 200 includes a first rotating member 210, a second rotating member 220, and a third rotating member 230. The first rotating member 210 and the second rotating member 220 are rotatably connected through a first rotating shaft 610. The first rotating member 210 is also rotatably connected to the support structure 100 through a third rotating shaft. The second rotating member 220 and the third rotating member 230 are rotatably connected through a second rotating shaft 620. Each synchronization structure 400 is also slidably connected to a rotating member 201 in a corresponding rotating mechanism 200. For example, a side of the synchronization structure 400 away from the support structure 100 is slidably connected to the third rotating member 230, so that when the rotating mechanism 200 rotates relative to the support structure 100, the synchronization structure 400 slides relative to the third rotating member 230. With this design, based on the slidable connection between the synchronization structure 400 and at least one rotating member 201 in the corresponding rotating mechanism 200, not only can the synchronization structure 400 be used to make the two rotating mechanisms 200 rotate synchronously, but also the change in the distance between the synchronization structure 400 and the rotating mechanism 200 can be adapted through the relative sliding between the synchronization structure 400 and the rotating member 201, thereby improving the smooth rotation of the hinge when switching between the unfolded position and the folded position.

In addition, when the synchronization structure 400 is slidably connected to the rotating member 201 located farthest from the support structure 100 in the same rotating mechanism 200, for example, in this example, the synchronization structure 400 is slidably connected to the outermost third rotating member 230 in the rotating mechanism 200, the motion consistency between the respective rotating members 201 in the rotating mechanism 200 can be improved, thereby improving the rotational synchronization and stability of the synchronization structure 400 and the rotating mechanism 200.

In some embodiments, as shown in FIG. 3, FIG. 4, FIG. 8 and FIG. 9, each synchronization structure 400 includes two synchronization members 401, and first sides of the two synchronization members 401 in the same synchronization structure 400 are rotatably connected to the support structure 100, respectively, and second sides of the two synchronization members 401 in the same synchronization structure 400 are slidably connected to the third rotating member 230, respectively. In some embodiments, the two synchronization members 401 in the same synchronization structure 400 are symmetrically arranged relative to the second centerline 102 of the support structure 100. Such a design can make the two synchronization members 401 in the same synchronization structure 400 have the same structure, thereby simplifying the structure of the hinge, reducing the component types of the hinge, and reducing the cost of the hinge.

In some embodiments, as shown in FIG. 3, FIG. 4, FIG. 8 and FIG. 9, the third rotating member 230 is provided with two sliding grooves 233 on the side facing the second rotating shaft 620, and two synchronization members 401 in the same synchronization structure 400 are slidably mounted in the corresponding two sliding grooves 233, respectively.

As an example, the two sliding grooves 233 are arranged symmetrically with respect to the second centerline 102.

As an example, as shown in FIG. 4, FIG. 8 and FIG. 9, two sets of guide members are provided on the back of the third rotating member 230. Each set of guide members includes two guide blocks 234 arranged along the first direction. The two guide blocks 234 are each provided with a guide groove on the sides facing each other, and one sliding groove 233 is formed by the two guide blocks 234 and two guide grooves together. Among the two synchronization members 401 in the same synchronization structure 400, each synchronization member 401 is provided with a guide rib 410 at both ends along the first direction. The two guide ribs 410 are parallel to each other and extend along the second direction. When each synchronization member 401 is slidably mounted in a corresponding sliding groove 233, the two guide ribs 410 are slidably matched with the corresponding two guide grooves. With this design, by matching the guide ribs and guide grooves, the synchronizing member 401 slides more stably in the corresponding sliding groove 233, thereby improving the stability of the hinge when switching between the unfolded position and the folded position.

Based on the forgoing embodiments, the hinge further includes at least two transition members 500 corresponding to at least two synchronization structures 400 one by one. The transition member 500 is located between a corresponding synchronization structure 400 and the rotating mechanism 200, and is rotatably connected with to the corresponding synchronization structure 400 and rotating mechanism 200. As an example, as shown in FIG. 4, FIG. 8 and FIG. 9, the hinge includes two transition members 500, and the transition members 500 may be connecting rods. Each transition member 500 is located between the corresponding synchronization structure 400 and rotating mechanism 200, and is rotatably connected to the corresponding synchronization structure 400 and rotating mechanism 200. With this design, the transition member 500 can be used to pull the synchronization structure 400 to rotate synchronously with the rotating mechanism 200. Since both sides of the transition member 500 are rotatably connected to the synchronization structure 400 and the rotating mechanism 200 respectively, the transition member 500 can adapt to the distance change between the rotating mechanism 200 and the synchronization structure 400, thereby improving the stability of the hinge when switching between the unfolded position and the folded position.

The first side of the transition member 500 is provided a fifth connecting part, and the fifth connecting part is rotatably connected to the fourth connecting part of the first rotating member 210 and the third connecting part of the second rotating member 220. The second side of the transition member 500 is rotatably connected to the two synchronization members 401 of a same synchronization structure 400. As an example, the fifth connecting part includes at least two fifth lugs 510 provided on the first side of the transition member 500 and spaced apart along the first direction. Each fifth lug 510 is provided with a fifth through hole 511, and the fifth through holes 511 in the transition members 500 are coaxially arranged. The transition member 500 is rotatably connected to the first rotating member 210 and the second rotating member 220 respectively through the first rotating shaft 610 that passed through the respective fifth through holes 511. In other words, the fifth lugs 510 of the transition member 500, the fourth lugs 212 of the first rotating member 210, and the third lugs 221 of the second rotating member 220 are fitted into each other, and are used to achieve the rotatable connection through the first rotating shaft 610 in respective ones of the fifth through holes 511, the fourth through holes 213 and the third through holes 223.

A fourth rotating shaft 630 is provided on the second side of the transition member 500. In other words, the fourth rotating shaft 630 is provided on the side of the transition member 500 that is rotatably connected to the synchronization structure 400, and the two ends of the fourth rotating shaft 630 are respectively inserted through the middle part of two synchronization members 401 of a same synchronization structure 400, thereby achieving the rotatable connection with the two synchronization members 401. Such a design not only allows the two synchronization members 401 of the same synchronization structure 400 to rotate synchronously with the rotating mechanism 200, but also allows the transition member 500, which is rotatably connected to the first rotating member 210 and the second rotating member 220, to share the first rotating shaft 610 with the first rotating member 210 and the second rotating member 220, thereby reducing the number of components in the hinge and simplifying the structure of the hinge.

In some embodiments, as shown in FIG. 4, FIG. 8, FIG. 9 and FIG. 10, the two ends of the transition member 500 along the first direction are respectively provided with first stop parts 520, two ends the second rotating member 220 are respectively provided with second stop parts 222, and two ends of the third rotating member 230 are respectively provided with third stop parts (that is, at the end of the guide block 234 facing the second rotating member 220). When the hinge is in in the folded position, the first stop parts 520, the second stop parts 222 and the third stop parts abut with sequentially, so that centers of the first rotating shaft 610, the second rotating shaft 620 and the fourth rotating shaft 630 are collinear when the hinge is in the folded position, thereby preventing the second rotating member 220 from rotating and swinging relative to the first rotating member 210, and preventing the third rotating member 230 from rotating and swinging relative to the second rotating member 220, so as to improve the reliability of the foldable electronic device, which applies this hinge and in the closed position, during drop testing, as well as increase the service life of foldable electronic device.

As an example, as shown in FIG. 8, FIG. 9 and FIG. 10, the first stop part 520 includes a first arc-shaped concave surface 521, and correspondingly, the second stop part 222 includes a first arc-shaped convex surface 226, where the first arc-shaped convex surface 226 is located in the first arc-shaped concave surface 521. The second stop part 222 is provided with a first inclined portion 227 on the side thereof facing the third rotating member 230, and the third stop part is provided with a second inclined portion 237 that matches the first inclined portion. The first arc-shaped convex surface 226 and the first arc-shaped concave surface 521 have the same or similar shape, and both can be arc-shaped or approximately arc-shaped. When the hinge is in the folded position, the first inclined portion 2 27 and the second inclined portion 237 abut with each other, and centers of the first arc-shaped concave surface 521, the first arc-shaped convex surface 226, the first rotating shaft 610, the second rotating shaft 620 and the fourth rotating shaft 630 are collinear.

In some embodiments, as shown in FIG. 3, FIG. 4, FIG. 11 and FIG. 12, the hinge further includes two gear sets 700. The two gear sets 700 are located at both ends of the support structure 100 along the first direction, and the two gear sets 700 are symmetrical with respect to the second centerline 102. Each gear set 700 includes two synchronization gears meshing with each other, and the two synchronization gears in the same gear set are arranged symmetrically with respect to the first centerline 101. The two synchronization gears in the gear set 700 located at the upper end of the support structure 100 correspond to the two synchronization gears in the gear set 700 located at the lower end of the support structure 100, and are respectively located on two parallel axes, where the two axes are symmetrical with respect to the first centerline 101.

First side of each synchronization structure 400 is rotatably connected to two synchronization gears located on the same side of the first centerline, that is, the first sides of the two synchronization members 401 of each synchronization structure 400 are rotatably connected to the two synchronizing gears on the same side of the first centerline, respectively. Second side of each synchronization structure 400 is slidably connected to the third rotating member 230. The middle part of each synchronization structure 400 is rotatably connected to the first rotating member 210 and the second rotating member 220 respectively through the fourth rotating shaft 630. In some embodiments, by arranging two synchronization gears that mesh with each other, synchronous rotation can be achieved between the respective synchronization structures 200.

The two synchronization gears in each gear set 700 are mounted at one end of the support structure 100. The two synchronization gears can be rotatably connected to the support structure 100 through gear shafts, so that the two synchronization gears can be synchronously rotated relative to the support structure 100.

In some embodiments, as shown in FIG. 3, FIG. 4, FIG. 11 and FIG. 12, two tie rods 710 are respectively provided at both ends of the support structure 100. In other words, a total of four tie rods 710 are provided on the support structure 100. Specifically, two tie rods 710 are provided at the upper end of the support structure 100, and two tie rods 710 are further provided at the lower end of the support structure 100, and the tie rods 710 located at the upper and lower ends of the support structure 100 are coaxial and in one-to-one correspondence. As an example, two tie rods 710 at the same end of the support structure 100 are symmetrical with respect to the first centerline 101, and the two tie rods 710 located at the upper and lower ends of the support structure 100 are symmetrical with respect to the second centerline 102.

Each of two synchronization members 401 of the same synchronization structure 400 is provided with a transmission part 430 on the first side. Mounting hole 431 are provided in the center of the two transmission parts 430. The two transmission parts 430 are sleeved on the two tie rods 710 located on the same side of the first centerline 101 through their respective mounting holes 431, and can rotate around the corresponding tie rod 710. The second side of the two synchronization members 401 of the same synchronization structure 400 is slidably connected to the corresponding third rotating members 230.

Each tie rod 710 is mounted on the support structure 100. As an example, as shown in FIG. 3, FIG. 5 and FIG. 10, two tie rod mounting holes 122 are respectively provided at the upper end and the lower end of the support structure 100. The insertion ends of the two tie rods 710 are respectively mounted and fixed in the two corresponding tie rod mounting holes 122. In this example, each tie rod 710 is provided with an annular groove 711 in an area near its insertion end, a limitation hole 121 is provided in an area of the cover plate 120 corresponding to the annular groove 711, and a clamping member 124, engaging with the annular groove 711 and the limitation hole 121 respectively, is mounted within the limitation hole 121. With this design, the tie rods 710 can be quickly disassembled and assembled through the clamping members 124, thereby improving the maintainability of the hinge. In this example, the clamping member 124 is a U-shaped clamping member. The distance between two sidewalls of the U-shaped clamping member is smaller than an outer diameter of the tie rod 710 and larger than a bottom diameter of the annular groove 711, thereby making the clamping member 124 engage and fix the tie rod 710 in the support structure 100, so as to prevent the tie rod 710 from being separated from the support structure 100.

As shown in FIG. 3, FIG. 4, FIG. 8, FIG. 9, FIG. 11 and FIG. 12, based on the forgoing embodiments, the hinge further includes a damping adjustment mechanism 800. The damping adjustment mechanism 800 includes a damping gear 810, a damping plate 820 and a damping spring 830. The damping gear 810, the damping plate 820 and the damping spring 830 are sleeved on the tie rod 710. The damping plate 820 is located between the damping gear 810 and the damping spring 830. Two ends of the damping spring 830 abuts with respectively with the damping plate 820 and the tie rod 710. The damping gear 810 meshes with the synchronization gear, a first end of each damping gear 810 is engaged with a corresponding synchronization member 401, a second end of each damping gear 810 is provided with a plurality of first convex teeth 812, and the plurality of first convex teeth 812 are arranged at intervals along the circumferential direction of the damping gear 810. A plurality of second convex teeth 821 matching with the plurality of first convex teeth 812 are provided on a side of the damping plate 820 facing the damping gear 812.

As an example, the hinge includes two damping adjustment mechanisms 800 located at both ends of the support structure 100. Each damping adjustment mechanism 800 includes two damping gears 810, a damping plate 820 and two damping springs 830. In some embodiments, the damping gear 810 and the damping plate 820 are provided with through holes for the tie rod 710 to pass through. The damping plate 820 is provided with two through holes. The two through holes on the damping plate 820 are symmetrical relative to the first centerline 101. The damping spring 830 may be a coil spring, and the middle part of the coil spring is provided with a through hole for the tie rod 710 to pass through. Each tie rod 710 is sleeved with one damping gear 810 and one damping spring 830. The damping plate 820 is sleeved on the two tie rods 710. The damping plate 820 is located between the damping gear 810 and the damping spring 830. Two ends of the damping spring 830 abut with the damping plate 820 and an end cap 712 of the tie rod 710, respectively, and are used to provide the damping plate 820 with elastic force toward the support structure 100.

The two damping gears 810 are meshed with the two synchronization gears respectively, and the first end of each damping gear 810 is engaged with a corresponding synchronization member 401. For example, as shown in FIG. 8, FIG. 9, FIG. 11 and FIG. 12, the first end of each damping gear 810 is provided with at least two notches 811, and the corresponding synchronization member 401 is provided with at least two protrusions 432. Alternatively, the first end of each damping gear 810 is provided with at least two protrusions, and the corresponding synchronization member 401 is provided with at least two notches. The at least two notches 811 and the at least two protrusions 432 fit into each other, so that the synchronization member 401 can rotate following the synchronization gear or, in other words, the synchronization member 401 drives the synchronization gear to rotate.

Each damping gear 810 is provided with a plurality of first convex teeth 812 at the second end, and the plurality of first convex teeth 812 extend along the circumferential direction of the damping gear 810. The side of the damping plate 820 facing the second end of the damping gear 810 is provided with second convex teeth 821 adapted to the matching portion of the first convex teeth 812. The clastic force provided by the damping spring 830 can be used to make the third convex teeth 821 mesh with the first convex teeth 812. When the rotating mechanism 200 rotates, the two synchronization members 401 drive the damping gear 810 and the synchronizing gear to rotate. When the damping gear 810 rotates, the first convex teeth 812 rotates relative to the second convex teeth 821, causing the damping gear 810 to squeeze the damping plate 820, causing the damping spring 830 to be in a compressed state, thereby changing the friction between the second convex teeth 821 and the first convex teeth 812, that is, changing the damping force between the second convex teeth 821 and the first convex teeth 812, so that the hinge can stay at any position.

The damping gear 810 can be a complete gear or an incomplete gear. As an example, the damping gear 810 can be an incomplete gear, for example, a quarter incomplete gear. In other words, at the outer peripheral surface of the damping gear 810, a quarter of the outer peripheral surface is formed with teeth, and the remaining three-quarters of the outer peripheral surface is a smooth surface.

Continuing to refer to FIG. 11 and FIG. 12, each damping adjustment mechanism 800 further includes an end plate 850 and an auxiliary spring 840. The end plate 850 is provided with through holes for the two tie rods 710 to pass through. Two through holes of the end plate 850 are arranged symmetrically with respect to the first centerline 101. The end plate 850 is sleeved on the two tie rods 710 through the two through holes, and the end plate 850 is located the end of the two tie rods 710, and abut with the end caps 712 of the two tie rods 710. The two damping springs 830 are located between the damping plate 820 and the end plate 850, and abut with the damping plate 820 and the end plate 850 respectively.

The side of the end plate 850 facing the damping plate 820 is provided with a first limiting pin 851. The side of the damping plate 820 facing the end plate 850 is provided with a second limiting pin 822. The first limiting pin 851 is directly opposite to the second limiting pin 822, or in other words, the first limiting pin 851 and the second limiting pin 822 are coaxially arranged. The auxiliary spring 840 is located between the damping plate 820 and the end plate 850, and is sleeved on the first limitation pin 851 and the second limitation pin 822. The two ends of the auxiliary spring 840 also abut with the damping plate 820 and end plate 850 respectively. It can be understood that the auxiliary spring 840 can be the same as the damping spring 830 or different therefrom. For example, the auxiliary spring 840 is a coil spring with a greater compression force than the damping spring 830. By providing the auxiliary spring 840, the damping force between the damping plate 820 and the damping gear 810 can be flexibly adjusted, thereby being suitable for different users' needs for different damping forces. In addition, provision of the end plate 850 can also make full use of the clastic force of the damping spring 830 and the auxiliary spring 840, thereby reducing the clastic force loss of the damping spring 830 and the auxiliary spring 840, and improving utilization efficiency of the elastic force provided by the damping spring 830 and the auxiliary spring 840.

According to some embodiments, an aspect of this application provides a hinge, including a support structure, at least two rotating mechanisms and at least one elastic structure, two of the at least two rotating mechanisms are rotatably connected to two opposite sides of the support structure, and the at least one elastic structure is configured to reduce a fitting gap at a connection between the support structure and the rotating mechanism and/or a fitting gap at a connection between adjacent rotating members within the rotating mechanism.

In some embodiments, adjacent rotating mechanisms located on a same side of the support structure are rotatably connected, the at least one elastic structure is at least provided at a connection between the adjacent rotating mechanisms located on the same side of the support structure, and the at least one elastic structure is configured to reduce a fitting gap at the connection between the adjacent rotating mechanisms on the same side of the support structure.

In some embodiments, the rotating mechanism includes at least two rotating members that are rotatably connected in sequence, and one rotating member of the at least two rotating members on one side is rotatably connected to the support structure, the at least one clastic structure is provided at a connection between the support structure and the rotating member, and/or at the connection between the adjacent rotating members within the rotating mechanism.

In some embodiments, the connection between the support structure and the rotating member, and the connection between any two adjacent rotating members within the rotating mechanism are each provided with one elastic structure.

In some embodiments, the rotating mechanism includes a first rotating member, a second rotating member and a third rotating member that are rotatably connected in sequence, and the first rotating member is rotatably connected to the support structure, the at least one elastic structure is provided at at least one of following connections:

- a connection between the first rotating member and the support structure;
- a connection between the first rotating member and the second rotating member; and
- a connection between the second rotating member and the third rotating member.

In some embodiments, the first rotating member and the second rotating member are rotatably connected through a first rotating shaft, and the second rotating member and the third rotating member are connected through a second rotating member, the elastic structure is sleeved on the first rotating shaft and/or the second rotating shaft, and the elastic structure is configured to reduce, when the hinge is in a folded position, radial fitting gaps between the second rotating shaft and respective one of the second rotating member and the third rotating member, and/or radial fitting gaps between the first rotating shaft and respective one of the first rotating member and the second rotating member.

In some embodiments, the elastic structure at least includes a torsion spring, the torsion spring is sleeved on the second rotating shaft, both ends of the torsion spring are fixedly connected to the second rotating member and the third rotating member, respectively, and the torsion spring is configured to reduce, when the hinge is in the folded position, the radial fitting gaps between the second rotating shaft and respective one of the second rotating member and the third rotating member.

In some embodiments, a first connecting part is provided on one side of the third rotating member close to the second rotating member, a second connecting part is provided on one side of the second rotating member close to the third rotating member, and the third rotating member is rotatably connected to the second rotating member through the first connecting part, the second rotating shaft and the second connecting part.

In some embodiments, the first connecting part includes at least two first lugs provided on the side of the third rotating member close to the second rotating member and spaced apart along a first direction, and first through holes are provided in the first lugs, the second connecting part includes at least two second lugs provided on the side of the second rotating member close to the third rotating member and spaced apart along the first direction, and second through holes are provided in the second lugs, and the second rotating shaft passes through each of the first through holes and each of the second through holes, and is rotatable relative to each of the first through holes and each of the second through holes.

In some embodiments, each of the first lugs is located between two adjacent ones of the second lugs, and/or, each of the second lugs is located between two adjacent ones of the first lugs, one end of the torsion spring is located between two first lugs in a middle position among the at least two first lugs, and another end of the torsion spring is located between two second lugs in a middle position among the at least two second lugs.

In some embodiments, the third rotating member includes a body and a pressure plate that are fixedly connected, the body has at least two first docking parts, the pressure plate has at least two second docking parts in one-to-one correspondence with the at least two first docking parts, the first docking parts and the second docking parts are provided with semicircular holes, and the first lugs are formed by the first docking parts and the second docking parts docking together.

In some embodiments, a third connecting part is provided on one side of the second rotating member close to the first rotating member, a fourth connecting part is provided on one side of the first rotating member close to the second rotating member, and the second rotating member is rotatably connected to the first rotating member through the third connecting part, the first rotating shaft and the fourth connecting part.

In some embodiments, the third connecting part includes at least two third lugs provided on the side of the second rotating member close to the first rotating member and spaced apart along a first direction, and third through holes are provided in the third lugs, the fourth connecting part includes at least two fourth lugs provided on the side of the first rotating member close to the second rotating member and spaced apart along the first direction, and fourth through holes are provided in the fourth lugs, and the first rotating shaft passes through each of the third through holes and each of the fourth through holes, and is rotatable relative to each of the third through holes and each of the fourth through holes.

In some embodiments, each of the third lugs is located between two adjacent ones of the fourth lugs, and/or, each of the fourth lugs is located between two adjacent ones of the third lugs, and respective ones of the fourth lugs and respective ones of the third lugs are arranged alternately along the first direction.

In some embodiments, the rotating mechanism includes a first rotating member rotatably connected to the support structure, and the elastic structure is provided at a connection between the first rotating member and the support structure.

In some embodiments, the rotating mechanism includes a first rotating member and a second rotating member, one side of the first rotating member is rotatably connected to the support structure, another side of the first rotating member is rotatably connected to the second rotating member, and the elastic structure is provided at a connection between the first rotating member and the second rotating member and/or a connection between the first rotating member and the support structure.

In some embodiments, the rotating mechanism includes a first rotating member rotatably connected to the support structure, the first rotating member includes an arc-shaped mounting portion, the support structure includes a third rotating shaft, and the arc-shaped mounting portion is rotatably mounted on an outer peripheral surface of the third rotating shaft, the elastic structure is mounted between the arc-shaped mounting portion and the third rotating shaft, one end of the elastic structure is fixedly connected to the support structure, another end of the elastic structure abuts with an outer peripheral surface of the arc-shaped mounting portion, and the elastic structure is configured to cause the arc-shaped mounting portion to abut with the outer peripheral surface of the third rotating shaft.

In some embodiments, the support structure includes a support plate and a cover plate that are oppositely arranged, a surface of the support plate facing the cover plate is provided with an arc-shaped protrusion serving as the third rotating shaft, a surface of the cover plate facing the support plate is provided with an arc-shaped groove, and an arc-shaped mounting groove is formed by the arc-shaped groove and the arc-shaped protrusion, the arc-shaped mounting portion is rotatably mounted in the arc-shaped mounting groove, the elastic structure is located in the arc-shaped mounting groove, one end of the elastic structure is fixedly connected to the support structure, another end of the elastic structure abuts with the outer peripheral surface of the arc-shaped mounting portion, and the elastic structure is configured to cause the arc-shaped mounting portion to abut with an outer peripheral surface of the arc-shaped protrusion.

In some embodiments, the elastic structure includes an arc-shaped elastic arm, the arc-shaped elastic arm is mounted in the arc-shaped mounting groove, one end of the arc-shaped elastic arm is fixedly connected to the support structure, and another end of the arc-shaped clastic arm abuts with the outer peripheral surface of the arc-shaped mounting portion.

In some embodiments, a plurality of spiral oil storage grooves are provided on a mating surface of the arc-shaped mounting portion and the arc-shaped protrusion.

In some embodiments, the hinge further includes at least two synchronization structures in one-to-one correspondence with the at least two rotating mechanisms, and the synchronization structures are synchronously rotatable with corresponding ones of the rotating mechanisms.

In some embodiments, the rotating mechanism at least includes a first rotation member, a second rotation member and a third rotation member, the first rotation member is rotatably connected to the support structure, the first rotating member and the second rotating member are rotatably connected through a first rotating shaft, and the second rotating member and the third rotating member are rotatably connected through a second rotating shaft, the synchronization structure is slidably connected to the third rotating member in a corresponding one of the rotating mechanisms, and the synchronization structure is configured such that, when the rotating mechanism rotates relative to the support structure, the synchronization structure slides relative to the third rotating member.

In some embodiments, the synchronization structure includes two synchronization members, and first sides of the two synchronization members of the same synchronization structure are rotatably connected to the support structure respectively, and second sides of the two synchronization members of the same synchronization structure are slidably connected to corresponding ones of the third rotating members respectively.

In some embodiments, two areas of the third rotating member, corresponding to the two synchronizing members of the same synchronization structure, are provided with two sliding grooves, respectively; and the second sides of the two synchronization members of the same synchronization structure are slidably mounted in the two corresponding sliding grooves, respectively.

In some embodiments, the hinge further includes at least two transition members in one-to-one correspondence with the at least two synchronization structures, where the transition member is located between a corresponding synchronization structure and the rotating mechanism, and is rotatably connected to the corresponding synchronization structure and the rotating mechanism.

In some embodiments, a first side of the transition member is provided with a fifth connecting part, the fifth connecting part is rotatably connected to a fourth connecting part of the first rotating member and a third connecting part of the second rotating member, and a second side of the transition member is rotatably connected to the two synchronization members of the same synchronization structure.

In some embodiments, the fifth connecting part includes at least two fifth lugs provided on the first side of the transition member and spaced apart along a first direction, and fifth through holes are provided in the fifth lugs; and the transition member is rotatably connected to the first rotating member and the second rotating member, respectively, through the first rotating shaft passing through each of the fifth through holes, a fourth rotating shaft is provided on the second side of the transition member, and the fourth rotating shaft is rotatably connected to the two synchronization members of the same synchronization structure.

In some embodiments, along the first direction, first stop parts are respectively provided at both ends of the transition member, second stop parts are respectively provided at both ends of the second rotating member, and third stop parts are respectively provided at both ends of the third rotating member; the first stop parts, the second stop parts and the third stop parts are configured such that, when the hinge is in a folded position, centers of the first rotating shaft, the second rotating shaft and the fourth rotating shaft are collinear.

In some embodiments, the first stop part includes a first arc-shaped concave surface, the second stop part includes a first arc-shaped convex surface, and the first arc-shaped convex surface is located within the first arc-shaped concave surface, the second stop part further includes a first inclined portion away from the first arc-shaped concave surface, the third stop part includes a second inclined portion, and when the hinge is in the folded position, the first inclined portion abuts with the second inclined portion, and centers of the first arc-shaped concave surface, the first arc-shaped convex surface, the first rotating shaft, the second rotating shaft and the fourth rotating shaft are collinear.

In some embodiments, two gear sets are respectively provided at both ends of the support structure, each of the gear sets includes two synchronization gears meshing with each other, the two synchronization gears of each of the two gear sets are in one-to-one correspondence and are respectively located on two parallel axes, and the two parallel axes are symmetrical with respect to a first centerline of the support structure, the first sides of the two synchronization members of the same synchronization structure are rotatably connected to the two synchronization gears located on a same side of the first centerline, respectively; the second sides of the two synchronization members of the same synchronization structure are slidably connected to a corresponding third rotating member; and the two synchronizing members of the same synchronization structure are rotatably connected to the transition member through a fourth rotating shaft.

In some embodiments, each of both ends of the support structure is provided with two tie rods, and the two tie rods are symmetrical with respect to the first centerline of the support structure, two transmission parts are respectively provided on the first sides of the two synchronization members of the same synchronization structure, the two transmission parts are sleeved on the two tie rods located on a same side of the first centerline, and the second sides of the two synchronization members of the same synchronization structure are slidably connected to a corresponding third rotating member.

In some embodiments, an annular groove is provided in an area of the tie rod close to its insertion end, a limitation hole is provided in an area of the support structure corresponding to the annular groove, and a clamping member, engaging with the annular groove and the limitation hole respectively, is mounted within the limitation hole.

In some embodiments, the clamping member is a U-shaped clamping member, and a distance between two sidewalls of the U-shaped clamping member is smaller than an outer diameter of the tie rod and is larger than a bottom diameter of the annular groove.

In some embodiments, the hinge further includes a damping adjustment mechanism, where the damping adjustment mechanism includes a damping plate, a damping gear and a damping spring, the damping gear, the damping spring and the damping plate are sleeved on the tie rod, the damping plate is located between the damping gear and the damping spring, and two ends of the damping spring abut with the damping plate and the tie rod, respectively, the damping gear meshes with the synchronization gear, a first end of each damping gear is engaged with the a corresponding one of the synchronization member, a second end of each damping gear is provided with a plurality of first convex teeth, and the plurality of first convex teeth are arranged at intervals along a circumferential direction of the damping gear, a plurality of second convex teeth, matching with the plurality of first convex teeth, are provided on a side of the damping plate facing the damping gear.

In some embodiments, the first end of each damping gear is provided with at least two notches, the synchronizing member is provided with at least two protrusions, and the at least two notches and the at least two protrusions fit into each other.

In some embodiments, the damping adjustment mechanism further includes an end plate and an auxiliary spring, the end plate is sleeved on the tie rod, and the end plate abuts with the tie rod, the end plate is provided with a first limitation pin, and the damping plate is provided with a second limitation pin directly facing the first limitation pin; the auxiliary spring is sleeved on the first limitation pin and the second limiting pin, and two ends of the auxiliary spring abut with the damping plate and the end plate, respectively.

In the hinge provided by this application, the elastic structure(s) is provided at the connection between the support structure and the rotating mechanism, and/or at the connection between adjacent rotating members within the rotating mechanism, so the elastic force provided by the elastic structure is used to reduce the fitting gap(s) between rotatably connected parts within the hinge, thereby improving the smoothness and stability during usage of the hinge. In addition, the elastic force provided by the elastic structure can also be used to reduce the abnormal rotation noise of the hinge when switching between a folded position and an unfolded position.

Some embodiments of this application further provide a foldable electronic device, which includes the hinge described in the forgoing embodiments. Since the foldable electronic device includes the forgoing hinge, the foldable electronic device also has the advantages thereof. For details, please refer to the relevant description above.

The foldable electronic device according to some embodiments of this application can be any foldable fixed terminal or mobile terminal, such as mobile phone, tablet computer, notebook computer, ultra mobile personal computer (UMPC), handheld computer, touch TV, walkie-talkie, netbook, personal digital assistant (PDA), wearable device, and virtual reality device.

Reference in the description to the terms "one embodiment," "some embodiments," "illustrative embodiments," "examples," "specific examples," "some examples" or the like means that specific features, structures, steps or characteristics described in connection with the embodiments or examples are included in at least one embodiment or example of this application. In this specification, schematic representations of the forgoing terms do not necessarily refer to the same embodiment or example. Furthermore, the specific features, structures, steps or characteristics as described may be combined in any suitable manner in any one or more other embodiments or examples.

Finally, it should be noted that the forgoing embodiments are only used to illustrate the technical solution of this application, but not to limit it. Although this application has been described in detail with reference to the foregoing embodiments, those of ordinary skill in the art should understand that, the technical solutions described in the foregoing embodiments can still be modified, or some or all of the technical features can be equivalently substituted; and these modifications or substitutions do not deviate from the essence of the corresponding technical solutions from the protection scope of the technical solutions according to the embodiments of this application.

The invention claimed is:

1. A hinge, characterized in comprising:

a support structure;

at least two rotating mechanisms, wherein two of the at least two rotating mechanisms are rotatably connected to two opposite sides of the support structure; and at least one elastic structure, wherein the at least one elastic structure is configured to reduce a fitting gap at a connection between the support structure and at least one of the rotating mechanisms and/or a fitting gap at a connection between adjacent rotating members within the rotating mechanism;

wherein at least one of the rotating mechanisms comprises a first rotating member rotatably connected to the support structure, the first rotating member comprises an arc-shaped mounting portion, the support structure comprises a third rotating shaft, and the arc-shaped mounting portion is rotatably mounted on an outer peripheral surface of the third rotating shaft;

the elastic structure is mounted between the arc-shaped mounting portion and the third rotating shaft, one end of the elastic structure is fixedly connected to the support structure, another end of the elastic structure abuts with an outer peripheral surface of the arc-shaped mounting portion, and the elastic structure is configured to cause the arc-shaped mounting portion to abut with the outer peripheral surface of the third rotating shaft.

2. The hinge according to claim 1, wherein adjacent rotating mechanisms located on a same side of the support structure are rotatably connected, the at least one elastic structure is at least provided at a connection between the adjacent rotating mechanisms located on the same side of the support structure, and the at least one elastic structure is configured to reduce a fitting gap at the connection between the adjacent rotating mechanisms on the same side of the support structure.

3. The hinge according to claim 1, wherein at least one of the rotating mechanisms comprises at least two rotating members that are rotatably connected in sequence, and one rotating member of the at least two rotating members is rotatably connected to the support structure;

the at least one elastic structure is provided at a connection between the support structure and the rotating member, and/or at the connection between the adjacent rotating members within the rotating mechanism.

4. The hinge according to claim 3, wherein the connection between the support structure and the rotating member, and the connection between any two adjacent rotating members within at least one of the rotating mechanisms are each provided with one elastic structure.

5. The hinge according to claim 3, wherein at least one of the rotating mechanisms comprises the first rotating member, a second rotating member and a third rotating member that are rotatably connected in sequence, and the first rotating member is rotatably connected to the support structure;

the at least one elastic structure is provided at at least one of following connections:

a connection between the first rotating member and the support structure;

a connection between the first rotating member and the second rotating member;

a connection between the second rotating member and the third rotating member.

6. The hinge according to claim 5, wherein the first rotating member and the second rotating member are rotatably connected through a first rotating shaft, and the second rotating member and the third rotating member are connected through a second rotating shaft;

the elastic structure is sleeved on the first rotating shaft and/or the second rotating shaft, and the elastic structure is configured to reduce, when the hinge is in a folded position, radial fitting gaps between the second rotating shaft and respective one of the second rotating member and the third rotating member, and/or radial fitting gaps between the first rotating shaft and respective one of the first rotating member and the second rotating member.

7. The hinge according to claim 6, wherein the elastic structure at least comprises a torsion spring, the torsion spring is sleeved on the second rotating shaft, both ends of the torsion spring are fixedly connected to the second rotating member and the third rotating member, respectively, and the torsion spring is configured to reduce, when the hinge is in the folded position, the radial fitting gaps between the second rotating shaft and respective one of the second rotating member and the third rotating member.

8. The hinge according to claim 7, wherein a first connecting part is provided on one side of the third rotating member close to the second rotating member, a second connecting part is provided on one side of the second rotating member close to the third rotating member, and the third rotating member is rotatably connected to the second rotating member through the first connecting part, the second rotating shaft and the second connecting part.

9. The hinge according to claim 8, wherein the first connecting part comprises at least two first lugs provided on the side of the third rotating member close to the second rotating member and spaced apart along a first direction, and first through holes are provided in the first lugs;

the second connecting part comprises at least two second lugs provided on the side of the second rotating member close to the third rotating member and spaced apart along the first direction, and second through holes are provided in the second lugs; and the second rotating shaft passes through each of the first through holes and each of the second through holes, and is rotatable relative to each of the first through holes and each of the second through holes.

10. The hinge according to claim 9, wherein each of the first lugs is located between two adjacent ones of the second lugs, and/or, each of the second lugs is located between two adjacent ones of the first lugs;

one end of the torsion spring is located between two first lugs in a middle position among the at least two first lugs, and another end of the torsion spring is located between two second lugs in a middle position among the at least two second lugs.

11. The hinge according to claim 9, wherein the third rotating member comprises a body and a pressure plate that are fixedly connected, the body has at least two first docking parts, the pressure plate has at least two second docking parts in one-to-one correspondence with the at least two first docking parts, the first docking parts and the second docking parts are provided with semicircular holes, and the first lugs are formed by the first docking parts and the second docking parts docking together.

12. The hinge according to claim 6, wherein a third connecting part is provided on one side of the second rotating member close to the first rotating member, a fourth connecting part is provided on one side of the first rotating member close to the second rotating member, and the second rotating member is rotatably connected to the first rotating member through the third connecting part, the first rotating shaft and the fourth connecting part.

13. The hinge according to claim 12, wherein the third connecting part comprises at least two third lugs provided on the side of the second rotating member close to the first rotating member and spaced apart along a first direction, and third through holes are provided in the third lugs;

the fourth connecting part comprises at least two fourth lugs provided on the side of the first rotating member close to the second rotating member and spaced apart along the first direction, and fourth through holes are provided in the fourth lugs; and the first rotating shaft passes through each of the third through holes and each of the fourth through holes, and is rotatable relative to each of the third through holes and each of the fourth through holes.

14. The hinge according to claim 13, wherein each of the third lugs is located between two adjacent ones of the fourth lugs, and/or, each of the fourth lugs is located between two adjacent ones of the third lugs; and respective ones of the fourth lugs and respective ones of the third lugs are arranged alternately along the first direction.

15. The hinge according to claim 1, wherein at least one of the rotating mechanisms comprises the first rotating member rotatably connected to the support structure, and the elastic structure is provided at a connection between the first rotating member and the support structure.

16. The hinge according to claim 1, wherein at least one of the rotating mechanisms comprises the first rotating member and a second rotating member, one side of the first rotating member is rotatably connected to the support structure, another side of the first rotating member is rotatably connected to the second rotating member, and the elastic structure is provided at a connection between the first rotating member and the second rotating member and/or a connection between the first rotating member and the support structure.

17. The hinge according to claim 1, wherein the support structure comprises a support plate and a cover plate that are oppositely arranged, a surface of the support plate facing the cover plate is provided with an arc-shaped protrusion serving as the third rotating shaft, a surface of the cover plate facing the support plate is provided with an arc-shaped groove, and an arc-shaped mounting groove is formed by the arc-shaped groove and the arc-shaped protrusion;

the arc-shaped mounting portion is rotatably mounted in the arc-shaped mounting groove;

the elastic structure is located in the arc-shaped mounting groove, and the elastic structure is configured to cause the arc-shaped mounting portion to abut with an outer peripheral surface of the arc-shaped protrusion.

18. The hinge according to claim 17, wherein the elastic structure comprises an arc-shaped elastic arm, the arc-shaped elastic arm is mounted in the arc-shaped mounting groove, one end of the arc-shaped elastic arm is fixedly connected to the support structure, and another end of the arc-shaped elastic arm abuts with the outer peripheral surface of the arc-shaped mounting portion.

19. A foldable electronic device, characterized in comprising a hinge, wherein the hinge comprises:

a support structure;

at least two rotating mechanisms, wherein two of the at least two rotating mechanisms are rotatably connected to two opposite sides of the support structure; and at least one elastic structure, wherein the at least one elastic structure is configured to reduce a fitting gap at a connection between the support structure and at least one of the rotating mechanisms and/or a fitting gap at a connection between adjacent rotating members within the rotating mechanism;

wherein at least one of the rotating mechanisms comprises a first rotating member rotatably connected to the support structure, the first rotating member comprises an arc-shaped mounting portion, the support structure comprises a third rotating shaft, and the arc-shaped mounting portion is rotatably mounted on an outer peripheral surface of the third rotating shaft;

the elastic structure is mounted between the arc-shaped mounting portion and the third rotating shaft, one end of the elastic structure is fixedly connected to the support structure, another end of the elastic structure abuts with an outer peripheral surface of the arc-shaped mounting portion, and the elastic structure is configured to cause the arc-shaped mounting portion to abut with the outer peripheral surface of the third rotating shaft.

* * * * *